(12) United States Patent
Hedges et al.

(10) Patent No.: US 8,374,920 B2
(45) Date of Patent: Feb. 12, 2013

(54) ANTI-COUNTERFEITING SYSTEM AND METHOD

(75) Inventors: Herbert C. Hedges, Portland, OR (US); Kevin R. Brown, Tigard, OR (US); Virginia M. Hanks, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 11 days.

(21) Appl. No.: 12/690,857

(22) Filed: Jan. 20, 2010

(65) Prior Publication Data

US 2010/0241528 A1    Sep. 23, 2010

Related U.S. Application Data

(60) Provisional application No. 61/146,259, filed on Jan. 21, 2009.

(51) Int. Cl.
*G06Q 30/00* (2012.01)
(52) U.S. Cl. .................................... 705/26.35; 705/26.1
(58) Field of Classification Search ............... 705/26–27
See application file for complete search history.

(56) References Cited

U.S. PATENT DOCUMENTS

| | | | |
|---|---|---|---|
| 7,505,935 B2* | 3/2009 | Mendiola et al. ................ 705/37 |
| 2004/0073498 A1* | 4/2004 | Breen et al. ....................... 705/27 |
| 2005/0137882 A1* | 6/2005 | Cameron et al. .................... 705/1 |
| 2005/0289061 A1* | 12/2005 | Kulakowski et al. ............ 705/50 |
| 2007/0187266 A1* | 8/2007 | Porter et al. .................. 206/232 |
| 2007/0211651 A1* | 9/2007 | Ahmed et al. ................. 370/256 |
| 2007/0214249 A1* | 9/2007 | Ahmed et al. ................. 709/223 |
| 2007/0214250 A1* | 9/2007 | Ahmed et al. ................. 709/223 |
| 2007/0214259 A1* | 9/2007 | Ahmed et al. ................. 709/224 |
| 2007/0217661 A1* | 9/2007 | Massoud ....................... 382/119 |
| 2008/0052184 A1* | 2/2008 | Junger et al. .................... 705/26 |
| 2008/0098077 A1* | 4/2008 | Lalonde et al. ............... 709/206 |
| 2008/0128496 A1* | 6/2008 | Bertranou et al. ............. 235/383 |
| 2008/0262960 A1* | 10/2008 | Malone et al. ................... 705/37 |
| 2009/0287498 A2* | 11/2009 | Choi ................................. 705/1 |

OTHER PUBLICATIONS

Pachuta, M. "How to Avoid Sports Memorabilia Fakes"(Investors Business Daily, May 3, 1999, p. A01).*

* cited by examiner

*Primary Examiner* — Jeffrey A Smith
*Assistant Examiner* — Ethan D Civan
(74) *Attorney, Agent, or Firm* — Banner & Witcoff Ltd.

(57) ABSTRACT

An online auction website has anti-counterfeiting measures. The website requires a seller of an item to input information about the product for sale, including at least a brand of the product and a product identification code. If the brand code and product identification code are not entered, the website does not allow the seller to post the item for sale. If entered, the brand and the product identification code are included in the listing on the online auction webpage that advertises the product for sale during the auction period. Verification may be performed on the item to determine its authenticity. The verification process includes comparing the listed brand and product identification codes with a plurality of authentic brand and product identification codes. When the brand and product identification codes are determined to be counterfeit, the listing is terminated and the sale of counterfeit items is prevented.

21 Claims, 8 Drawing Sheets

Create Your Listing

Categories where your listing will appear

Category
Clothing > Shoes & Accessories > Men's Shoes —— 602

Help Buyers find your item

TITLE —— 604

US SIZE —— 606
[ 9 ▾ ]

WIDTH —— 608
[ Medium ▾ ]

STYLE —— 610
[ Athletic ▾ ]
[ Basketball ▾ ]

COLOR —— 612
[ Grey ▾ ]

BRAND —— 614
[ XYZ CORP. ▾ ]

PRODUCT CODE ⓘ —— 618
[ 1234567890 ]

ANTI-COUNTERFEITING SYSTEM AND METHOD

RELATED APPLICATIONS

This application claims the benefit of U.S. Provisional Patent Application No. 61/146,259, filed on Jan. 21, 2009, which application is incorporated by reference and made a part hereof.

FIELD OF THE INVENTION

Aspects of the disclosure relate to online auction of items. More specifically, aspects of the disclosure describe methods and systems of combating sales of counterfeit items on an online auction website.

BACKGROUND

Sellers of quality goods have long been plagued by the sale of counterfeit goods. Counterfeit goods are an imitation of the quality goods and are usually made with a malicious intent to deceive buyers into believing that they are purchasing the quality goods. Counterfeit goods benefit from the reputation of the quality goods that they imitate. Counterfeit goods sellers oftentimes manufacture the counterfeit goods from components of lower quality than those components used to manufacture the quality goods. The presence of counterfeiters continues to expand. Oftentimes, the counterfeiters dedicate significant factory space to the manufacture of counterfeit goods and can produce high volumes of counterfeit goods in these factories. The counterfeiters sell their counterfeit goods at a cost that is lower than (and sometimes significantly lower than) the cost of the authentic goods. In this way, the sale of counterfeit goods has become a very profitable, albeit illegal, business.

Manufacturers of authentic goods must defend the integrity of their quality goods. Many research and development resources are invested by such manufacturers in developing and selling authentic goods. One way to help maintain the integrity of these goods is to help prevent counterfeiters from selling counterfeit goods. Some consumers unknowingly purchase counterfeit goods believing that they are authentic goods. The counterfeit sellers may lie to these consumers and allege that the counterfeit goods are the authentic goods. Some consumers purchase counterfeit goods (most often made from lower quality materials and manufacturing processes than the authentic goods) and mistake the counterfeit goods for the authentic goods. Other consumers knowingly purchase counterfeit goods. In any case, the reputation of the manufactures of authentic goods suffers because their brand name (or other commercial association with the authentic goods) becomes associated with lower quality counterfeit goods. Brand names are used to identify the source of the goods and are a very valuable marketing and business tool for the authentic manufacturers. Sellers of authentic goods lose profits when consumers knowingly or unknowingly purchase counterfeit goods rather than the quality good.

Certain anti-counterfeit methods have been developed that help to identify counterfeit goods during a sale. For example, the quality goods may exhibit a distinguishing feature or mark that clearly identifies its origin. The counterfeit goods may be manufactured by a method that is different that the manufacturing method employed to create the quality goods and thus has different physical qualities in the final product. Oftentimes, the manufacturers and/or sellers of quality goods place a distinguishing code or other identifying mark upon the quality good before it is available for sale. Such distinguishing codes and marks help a seller of quality goods to identify the counterfeit goods.

In recent years, many countries have developed bodies of law that protect the rights of the manufacturers of quality goods. Such laws declare that the manufacture and sale of counterfeit goods is an illegal act of a civil and/or a criminal nature. The government may reserve the right to force a seller and/or manufacturer of counterfeit goods to cease the sale and manufacture of such goods in that particular country. Many of these sellers and manufacturers of counterfeit goods are physically located in another country and may be difficult to find and thus difficult to bring into a criminal or civil lawsuit. In view of this difficulty, sellers of the quality goods may try to take action against the sellers of the counterfeit goods at the point of sale of the counterfeit goods, i.e., preventing the sale from occurring.

The relatively recent development of the Internet has encouraged many consumers to buy and sell goods over the Internet. Counterfeit goods sellers have also grown savvy in selling their counterfeit goods over the Internet. Verifying the authenticity of goods being purchased over the Internet is difficult until the goods are inspected by the buyer, which is often too late to resolve an authenticity problem. The seller has already been paid by the buyer by the time the buyer receives the goods and the seller can easily shield its true identity and/or otherwise avoid being caught. Selling of counterfeit goods on the Internet is a significant problem for sellers and manufacturers of authentic goods. Many consumers are suspicious of Internet purchases for these reasons. Any consumer who has experienced a scam in which the consumer believed that they were purchasing an authentic product, but received a counterfeit product may be discouraged from purchasing any products over the Internet in the future. These problems stifle sales of authentic products over the Internet.

One method of selling goods over the Internet is through online auction websites. Such online auction websites provide Internet users with access to various listings of items for sale, typically in one location (at a central website). Consumers may browse through the listings or "shop" at their leisure for items of interest in this manner anywhere they can connect to the Internet. Consumers can compare various items sold by many different sellers and/or manufactured by one or more different sources. Consumers are able to place bids on the items for purchase in an "auction" style arrangement and/or may choose to purchase the items on the spot. The auction may continue for a fixed or an indefinite period of time.

Manufacturers and/or sellers of an item posted on an online auction website may choose to or may be required to provide various characteristics about any products sold on an online auction website. Such characteristics may be included in the product listing or advertisement for the item on the online auction website. For example, a products' listing may be viewable through a webpage hosted by an online auctioneer. In this example, consumers are able to view the listings for various products that the consumer is considering for purchase. The consumers may be able to compare various products' listings and may be able to obtain some characteristics about the products through the products' listings before making a purchase.

In an attempt to prevent fraud or the sale of counterfeit goods, some online auctioneers require sellers to sign agreements that pledge that they will not engage in fraudulent or counterfeit activities prior to being permitted to sell any items through the online auction website. Many sellers that are willing to sell counterfeit goods are willing to sign such agreements, but do not obey the provisions of the user agreement regarding sale of fraudulent and/or counterfeit goods. If and when a counterfeit item is discovered on an online auctioneer's website, it may be removed and the seller may be reprimanded or banned from using the auction services. Significant efforts are necessary to monitor the listing on the online auctioneer's websites for the sale of counterfeit goods. Oftentimes, this monitoring process includes meticulous analysis of the listings on an individual basis by a person (i.e., a person is tasked to check individual products' listings and perform an analysis to determine whether the product is deemed counterfeit or fraudulent). The monitoring process is time-consuming, expensive, and subject to error.

Thus, while anti-counterfeiting measures according to the prior art provide a number of advantageous features, they nevertheless have certain limitations. Since many products are sold over the Internet and many counterfeit goods are sold on online auction websites, the art would greatly benefit from an anti-counterfeiting system and method that can be used with online auction websites that is capable of identifying counterfeit goods faster and more accurately. The present invention seeks to provide such a system to overcome certain limitations and drawbacks of the prior art, and to provide new features not heretofore available.

BRIEF DESCRIPTION OF THE DRAWINGS

A more complete understanding of the present invention and certain advantages thereof may be acquired by referring to the following description along with the accompanying drawings, wherein:

FIG. 6 illustrates a screenshot for creating a listing of an article of footwear to be sold on an online auction website.

DETAILED DESCRIPTION

Figure 1:
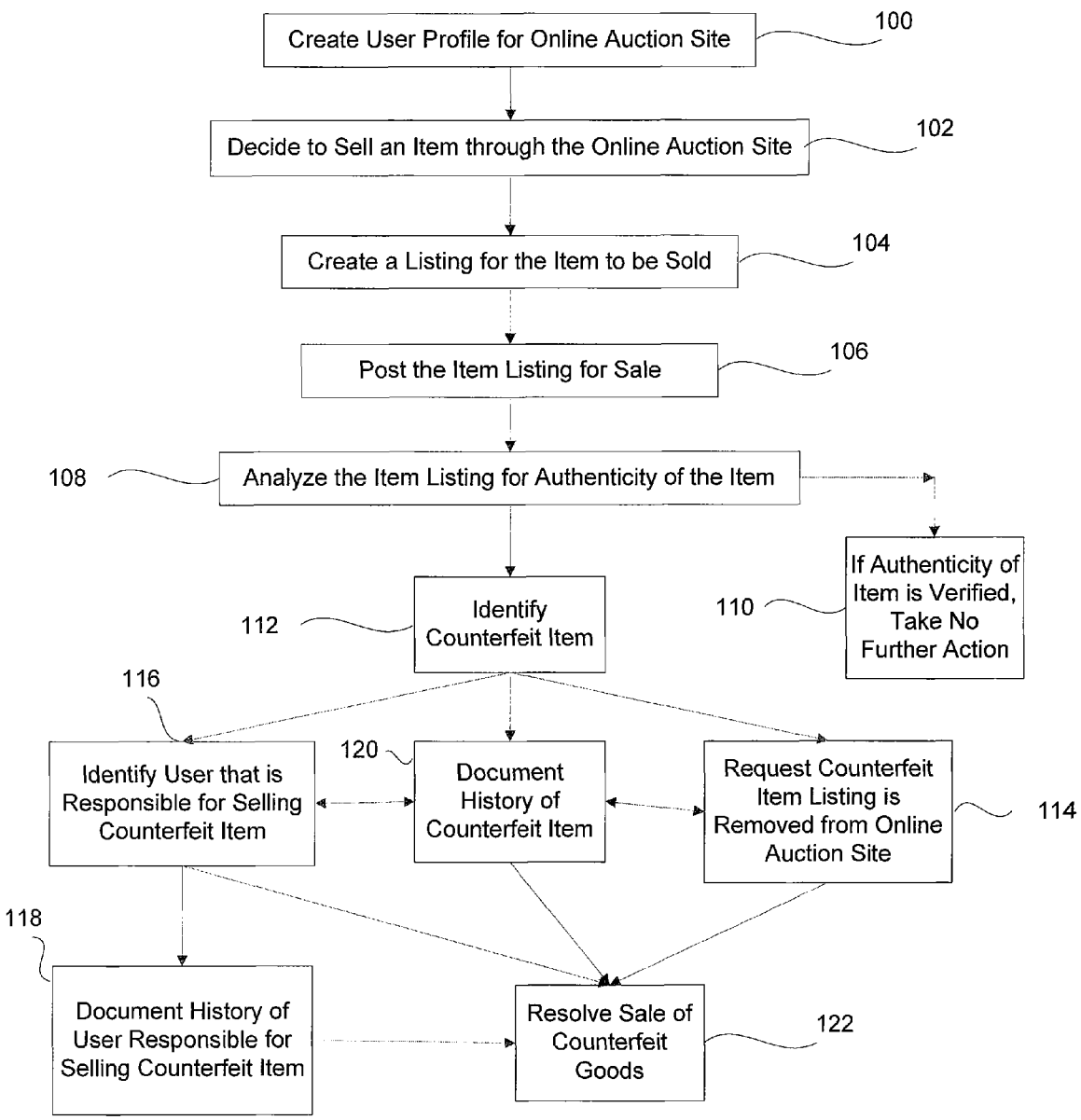
FIG. 1 is a flowchart of a process for posting an item for sale on an online auction website.

In the following description of various example embodiments of the invention, reference is made to the accompanying drawings, which form a part hereof, and in which are shown by way of illustration various example devices, systems, and environments in which aspects of the invention may be practiced. Other specific arrangements of parts, example devices, systems, and environments may be utilized and structural and functional modifications may be made without departing from the scope of the present invention.

General Computing System for an Online Auction Website

An online auction may operate over a computer network, such as the Internet. An auctioneer may implement one or more servers (e.g., web-based servers) for hosting auctions of items between buyers and sellers. The auctioneer's server computer may permit a seller to create a listing of an item for sale. It may also allow a buyer to search among various posted listings for a particular item and to place a bid to purchase an item in an auction-style sale. The online auction website may also include a feature for purchasing the product outright (i.e., a "buy it now" option). Additionally, the auctioneers' server computers may facilitate an exchange of payment for an item after the auction has been completed. Both buyers and sellers may have user profiles that include general personal and contact information, user preferences, payment information, and the like. Any suitable information may be stored on the computing system for access over the Internet by its users (i.e., buyers, sellers, browsers, etc.).

Software may be stored on the auctioneer's computing system that may facilitate a user's access to the online auction website (i.e., through a web-based server). For example, a software program stored on the auctioneer's computing system memory (or in any other location) may comprise a set of instructions that cause the computing system to query a user for information relating to the user's profile, payment information, search terms for products being sold, product listing criteria for creating a listing for sale of an item, and the like. Such software may cause the computing system to perform any aspect relating to the online auction of items.

A general description of the computing system that may facilitate an online auction is described herein, as examples of one or more computing systems that may be used according to one or more embodiments of the invention. The computing system is only one example of a suitable computing environment and is not intended to suggest any limitation as to the scope of use or functionality of the invention. The computing system should not be interpreted as having any dependency or requirement relating to any one or combination of the illustrated components.

The invention is operational with numerous other general purpose or special purpose computing system(s) or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, smart phones, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that cause the computing system to perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

The computing system may include a computer having a processor for controlling overall operation of the computer and its associated components, including RAM, ROM, an input/output module or BIOS, and a memory. The computer typically includes a variety of computer readable media. The computer readable media may be any available media that may be accessed by the computer. By way of example, and not limitation, computer readable media may comprise computer storage media and communication media.

Computer storage media may be stored in the memory and may include information such as computer readable instructions, data structures, program modules, or other data. Computer storage media includes, but is not limited to, random access memory (RAM), read only memory (ROM), electronically erasable programmable read only memory (EEPROM), flash memory or other memory technology, CD-ROM, digital versatile disks (DVDs) or other optical disk storage, magnetic cassettes, magnetic tape, magnetic disk storage or other magnetic storage devices, and any other medium that can be used to store the desired information and that can be accessed by the computer.

Communication media may embody computer readable instructions, data structures, program modules, and/or other data in a modulated data signal such as a carrier wave or other transport mechanism. It may also include any information delivery media. Modulated data signals are signals that have one or more of its characteristics set or changed in such a manner as to encode information in the signal and allow for the exchange of information between users of the computing system, such as a buyer searching for an item on an online auction website and a seller that is posting a listing of an item for sale on an online auction website. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM may include one or more applications representing the application data stored in RAM while the computer is on and corresponding software applications (e.g., software tasks) are being executed.

The input/output module or BIOS may include a microphone, keypad, touch screen, and/or stylus through which a user of the computer may provide input. The input/output module or BIOS may also include one or more of a speaker for providing audio output and a video display device for providing textual, audiovisual, and/or graphical output.

Software may be stored within the computer system's memory and may provide instructions to the processor for enabling the computer system to perform various functions. For example, the memory may store software used by the computer system, such as an operating system, application software, middleware, hardware, or firmware.

The computer system may operate in a networked environment that supports connections to one or more remote computers. Remote computers may be personal computers or servers that include some or all of the elements described above in the description of the computer system. The network connections between the computer system and the remote computers may include a local area network (LAN), a wide area network (WAN), and any other network connection. The computer system is connected to the LAN through a network interface or adapter. The computer system may be a server and may include a modem or other means for establishing communications over the WAN and for accessing web pages stored on the computing system's web-based servers. For example, the remote computer may connect to a WAN such as the Internet through a modem connection to access the web pages of an online auction website. The network connections may include any communications link between computers.

The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program may be used by the computer system according to an embodiment of the invention. The application program may include computer executable instructions for invoking user functionality related to communication, such as email, short message service (SMS), and voice input and speech recognition applications.

The remote computers may also be mobile terminals including various other components, such as a battery, speaker, and antennas. The input/output module or BIOS may include a user interface including such physical components as a voice interface, one or more arrow keys, joystick, data glove, mouse, roller ball, touch screen, keypads or the like.

Each of the plurality of remote computers may contain software applications for creating a data file that is stored locally on the remote computer's memory. The software may be a set of detailed computer-executable instructions that allow a user to create data files that include text, images, and the like. The data files that may be stored on the remote computers may contain multiple individual files of data that may be uploaded to the computing system over the computer network. For example, a user operating a remote computer may create or upload one or more images of an item to be sold on an online auction website. Through the remote computer, the user may access the web page of the online auction by sending a request over the Internet to the web-based server to view a web page that permits the user to upload (electronically transfer the data file) the image of the item for sale to a web page that includes a listing of the item. The listing may become the webpage that other users may access during the auction process to view the item that is for sale.

The computer system may include memory for storing computer-readable instructions and a processor for executing the computer-executable instructions. The computer-executable instructions may be data in the form of program source code that may be capable of modifying data. The computer-executable instructions may be a series or sequence of instructions for a computing device that is typically in the form of a programming language such as C++, Java, SQL, or the like. Various computer programming languages may be used to create the computer-executable instructions, and the invention is not limited to the programming languages listed above.

The memory may be a portion of the computer system that stores data or other instructions. The memory may be retained or lost when power is lost to the system. The memory may provide access to data for a user or remote computers to edit and manage data files.

The processor may be capable of executing the computer-executable instructions stored in the memory of the computer system. The processor may be a centralized element within a computing system that is capable of performing computations and instructing various computing components to function in a particular manner. The computer-executable instructions may include data describing changes to the data requested by one or more remote computers over a computer network, such as the Internet.

Security precautions may be implemented to prevent unauthorized access or to limit access to data, such as a user name and password associated with a particular user profile. Any desirable security precautions may be implemented.

Computer-executable instructions may be located (e.g., physically or logically) in modules in the memory. The computer network may be any network that interconnects users and/or remote computers. According to at least one aspect of the invention, the computer network may provide shared access by two computing devices to at least a portion of the data in the plurality of modules.

For example, a computer network, such as the Internet, may provide access to the computing system of the online auctioneer to a plurality of users. Such a configuration may permit users to buy items, sell items, browse the website, upload data, and the like, of the online auctioneer. The computer network may be public or private and may be wired or wireless.

General Online Auction Anti-Counterfeiting Methods and Systems

Figure 2:
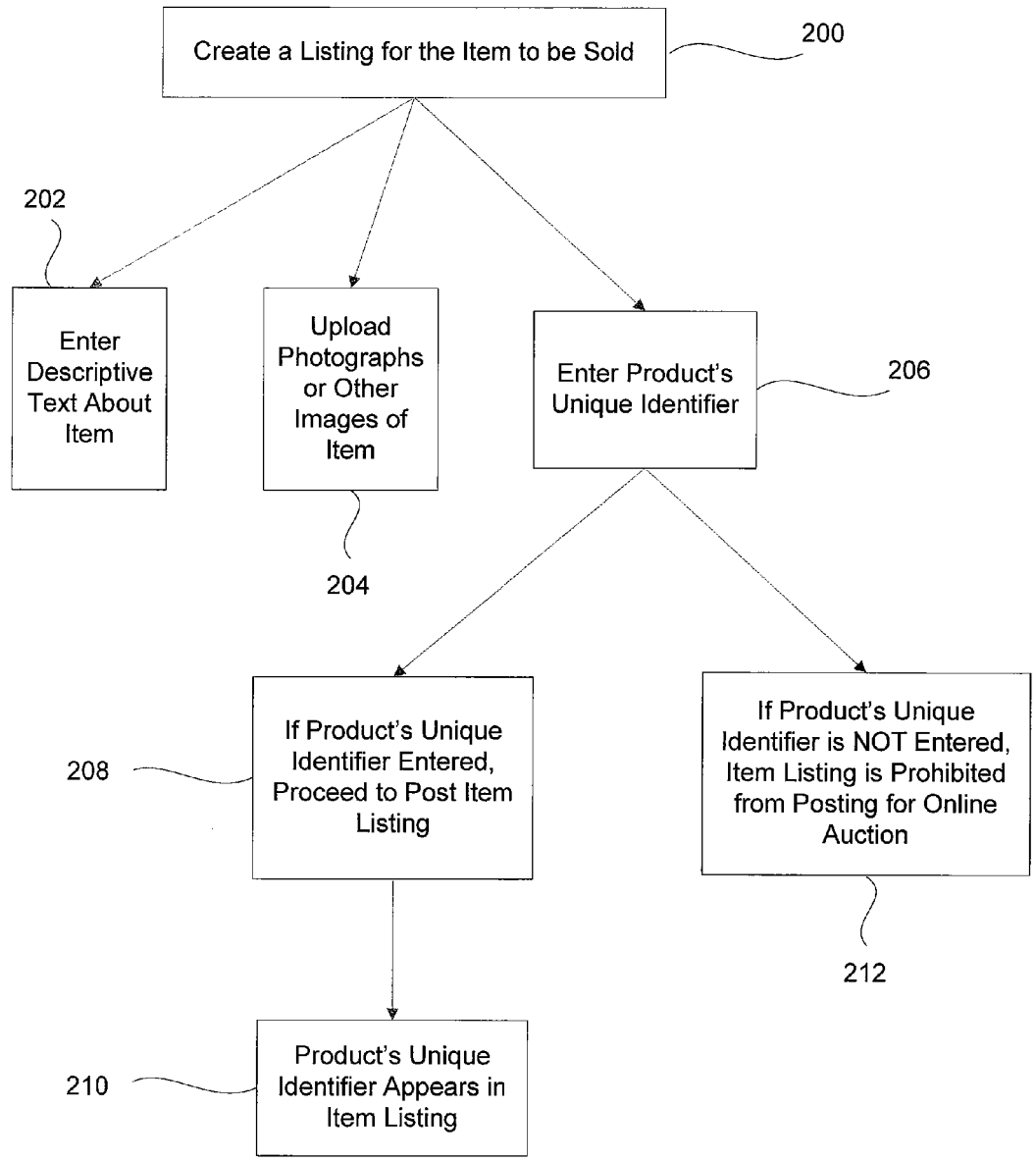
FIG. 2 is a flowchart of a process for creating a listing for the sale of an item having a unique product identifier on an online auction website.

An online auction website may be a host or "auctioneer" for buyers and sellers (or generally "users") to bid on various products and services over the Internet. A user may be any person or entity that is capable of accessing the online auction website. For example, a user may be a buyer, a seller, a browser, a manufacturer, a monitoring service, or anyone or any computing system that wishes to access the online auction's website. Sellers may post a product listing that describes a product being offered for sale, as illustrated in FIGS. 1 and 2. The listing may be an advertisement that buyers or potential buyers may view. The buyers may place bids on the items and when a winning bid is accepted by the seller, the item is exchanged for the agreed upon price. This transaction is facilitated by the online auctioneer's website. This website provides users with the ability to create user profiles, create web listings, conduct the auction of the item, search for items, and facilitate the exchange of money. Any suitable service may be provided by the online auctioneer.

As illustrated in FIG. 1, in order for a user to buy and/or sell an item, an online auctioneer may require the user to create a user profile 100. The user profile may include such user information as the user's name, date of birth, physical address, electronic mail address, telephone number, and the like. The user may select a username and password that is to be associated with the user's profile. The online auctioneer may request that the user enter the username and password before the user is permitted to buy and sell items through the online auction website (or any other security precaution such as a security code or secret question). Such user profile information may be stored in the memory of the auctioneer's computing system. The user profile information may be used to identify and contact the users.

Also illustrated in FIG. 1, a user may decide to sell an item through the online auction website 102. Once the user has decided to sell an item, the online auction website may require that the user proceed through a plurality of steps that solicit information from the seller about the item to be sold to create a listing for the item 104, 200, as illustrated in FIGS. 1 and 2. For example, the seller may be required to or optionally choose to enter descriptive text about the item 202, upload photographs or other images of the item 204, and enter the product's unique identifier 206. In another example, the online auction website may require that the user select a category that accurately describes the type of item being sold. Each category may be associated with a particular group of additional questions about the items. The questions may be a request for information about the physical characteristics of the item for sale. In some examples, the category will generate a request for information about specific characteristics of the item based on the chosen category. For example, a user that wishes to sell an article of apparel may be requested or required to enter information such as color, size, and style. In another example, a user that wishes to sell a car may be requested or required to enter information such as the make and model and color of the car. Additionally, unique identifying information may be requested or required by the auctioneer, such as a product identification number for the article of apparel example described above or the vehicle identification number for the car example that is described above.

The information gathered by the auctioneer about the item for sale may be used to create the listing for the item 104, 200, which is illustrated in FIGS. 1 and 2. The listing of the item is posted on the website of the online auctioneer as a webpage for the buyers or other users to view 106. As illustrated in FIG. 2, if a product's unique identifier is entered, the item listing may be posted to the online auctioneer's website 208. The product's unique identifier is required to appear in this listing 210. If the product's unique identifier is not entered, the item listing is prohibited from being posted to the online auctioneer's website 212 and thus is not available to be sold. The listing of the item oftentimes includes an option to place a bid to purchase the item or to buy the item immediately. When the seller agrees to a buyer's offer to purchase the item, the online auctioneer may facilitate the exchange of money between the buyer and the seller. The online auctioneer may provide the buyers and sellers of online auctioned items with the contact information of the other party to facilitate the transaction.

As further shown in FIG. 1, an analysis of the listings of the items for sale may be performed by any entity, person, or computing system to verify the authenticity of the item 108. If the item is verified to be an authentic item, no further action is taken and the transaction proceeds to completion 110. Sometimes items for sale in an online auction are identified as counterfeit items or a may be identified as potentially counterfeit items 112. When a counterfeit item is identified or an item is identified as a potentially counterfeit item, the item listing may be removed from the online auction website 114. The identity of the user that is responsible for selling the counterfeit item also may be discovered 116. The auctioneer may identify the seller's identity and may impose any suitable consequences for the seller's actions (including doing nothing). The sellers of the counterfeit goods may be tracked 118 and the history of the sale of a particular counterfeit item also may be tracked 120. This tracking may be performed by any entity, including, but not limited to the auctioneer and/or the manufacturer and/or seller of the authentic goods that are being damaged by the counterfeit goods. Third party monitoring entities could also perform the tracking operation on behalf of others.

For example, attempts to sell counterfeit items from a particular designer may be popular (e.g., NIKE® footwear, located in Beaverton, Oreg.) and the history of the sale of such counterfeit goods may be tracked. Creating a history of the sale of counterfeit items 118 and tracking the identities of the sellers of the counterfeit items 120 helps to assist the auctioneer and the manufacturer in discovering future listings that contain counterfeit goods. The history of a user that attempts to sell counterfeit items may also be documented. The historical information compiled can include multiple categories of information such as types of goods, overall quantities, quantities within a given period of time, prices at which the goods are offered for sale, and/or identities of buyers.

A resolution may be reached for the sale of the counterfeit goods 122, as shown in FIG. 1. A resolution may include any one or more of the following actions: removing the listing, holding the listing, denying the seller future access to the online auction website, pursuing legal action against the seller, and any other suitable resolution. In some examples, the resolution will be to do nothing in that particular instance and continue to track the sale of counterfeit goods for that particular item and/or to track the behavior of the seller of counterfeit goods. Such tracking and monitoring will increase the likelihood that the seller will be caught at a future time or that additional information may be learned about a group of sellers or a particular type of counterfeit goods.

When a listing is created for an item to be sold, the seller may be asked or required to enter information about the item. For example, an auctioneer may require that the seller enter information for various fields associated with characteristics of the item for sale. In some examples, the seller may enter descriptive text about the item 202, be permitted to upload photographs or other images of the item 204, and enter the product's unique identifier 206, as illustrated in FIG. 2. The product's unique identifier may be alphanumeric text or an image that is unique only to the specific item or a group of items. Such a product identifier may verify the authenticity of the item. Some or all of a plurality of fields may be required by the auctioneer before the listing is created and posted for the online auction.

For example, an online auctioneer may require that a seller enter the product's unique identifier before the listing is created and posted to the online auction website, as shown in FIG. 2. In this example, if the unique identifier is not entered, the listing is not created and therefore, the item is not posted for sale 212. Consequently, the user is prevented from selling the counterfeit item through the online auction website. If the unique identifier is entered, then the item is posted for sale in the online auction 208. In some examples, the product's unique identifier may appear in the item's listing during the online auction 210. In other examples, the product's unique identifier may be automatically inserted into the listing in locations such as the title and the description. A user viewing the listing may review and analyze the product's unique identifier before placing a bid on the item or purchasing the item. Further, the product's unique identifier may be used to verify the authenticity of the item during the online auction process.

The product's unique identifier may be authenticated. This may include comparing the entered product identifier to one or more valid product identifier's for the manufacturer of the item being sold. For example, if Company A allegedly manufactures the product being sold, then the unique product identifier input by the seller would be compared to a listing of unique product identifiers provided by Company A. Further, the format of the product identifier may be authenticated. For example, Company A may use unique product identifiers with eight alphanumeric digits. If the seller of the counterfeit goods does not enter a unique product identifier with eight alphanumeric digits, then the seller may be identified as a potentially counterfeit product and may be prevented from selling that item. The online auctioneer may provide assistance to the sellers to locate the product's unique product identifier.

In some examples, a list of authentic product code identifiers is compiled. This task may be performed by any entity. The entity may be the manufacturer, the online auctioneer, and/or a third party. The entity may also be a computing device that tracks authentic product identifiers. For example, the online auctioneer may have a software program that tracks and stores data relating to authentic product code identifiers for one or more manufacturers and/or sellers. The entity may use this list to authenticate new listing for products being sold. For example, an entity may view a new listing that is required to provide the product code. The entity may: (1) verify that the product code exists on the compiled list of authenticate product codes; and (2) verify that the product code matches the product being sold.

If the product code appearing on the listing appears to be an authentic product code (i.e., it appears on the authentic product code listing and/or is in the proper format for typical product codes for that particular manufacturer), then the entity may verify that the product code matches the product being sold. For example, if an authentic product code is provided and that product code matches a blue pair of shoes, then the entity will verify that the product being sold on the online auctioneer's website is a blue pair of shoes. In some examples, the listing on the auction website will have an authentic product code, but the listing will identify a product that does not match the authentic code.

In the example described above, the listing may include the authentic product code for the blue pair of shoes, but the listing advertises a brown pair of sandals for sale. This matching process may "match" any features of an authentic product code with the product being sold, including but not limited to: color, materials, year of manufacture, appearance, style, fit, etc. In another example, the manufacturer of an item being sold by a seller on an online auction website may have made articles of footwear under product code A in black and blue. In this example, the product listing may have for sale the article of footwear in white. When an entity (e.g., the online auctioneer or manufacturer) analyzes a listing to determine whether the product is authentic, the product code will appear authentic, but the entity will discover that the manufacturer did not manufacture articles of footwear in white under the listed product code. As discussed above, any information about the product, including but not limited to the product code, may be used to identify counterfeit items and/or to authenticate the product being sold.

Footwear Example of Online Auction Anti-Counterfeiting Methods and Systems

Figure 3:
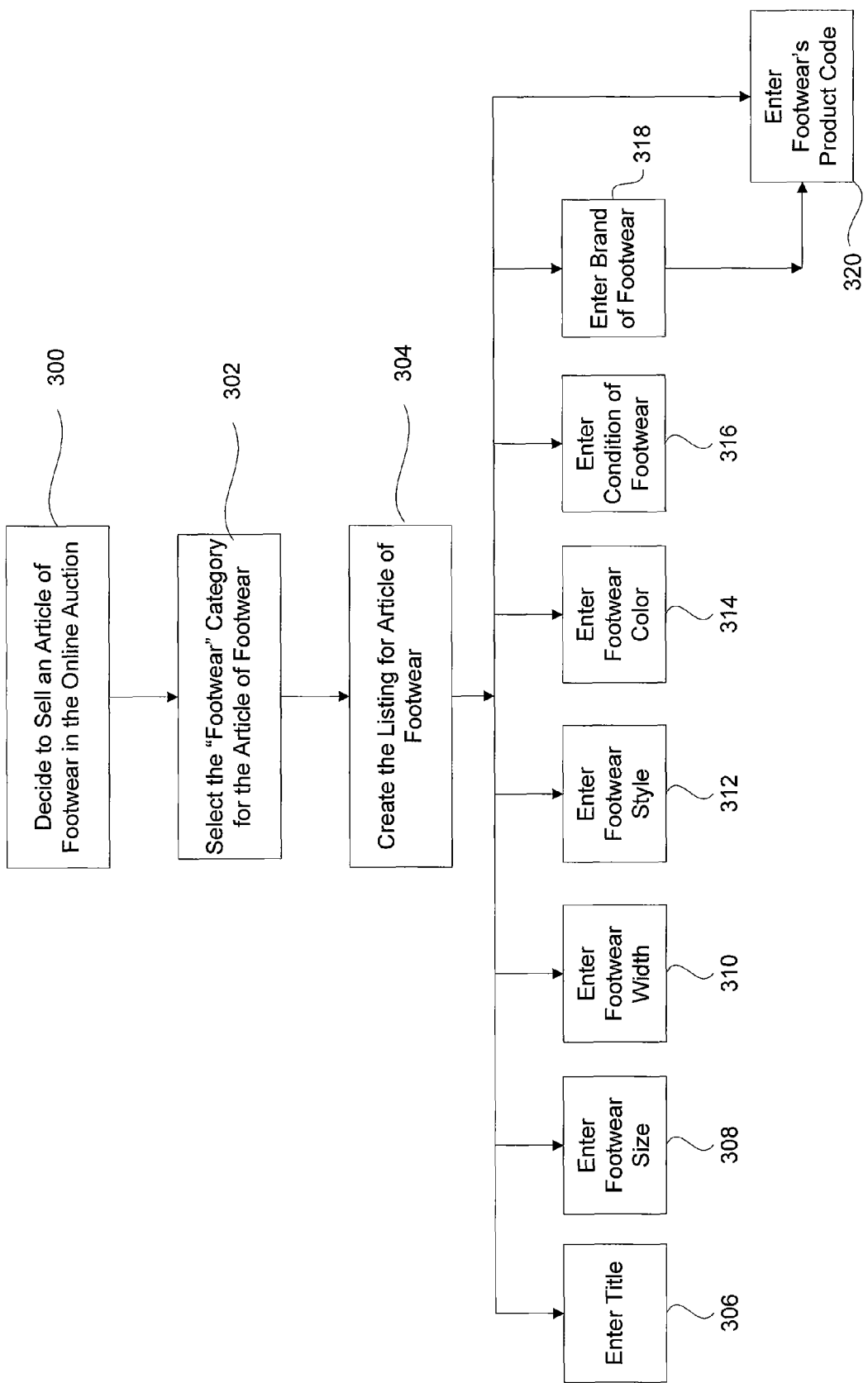
FIG. 3 is a flowchart of a process of posting a listing of the sale of an article of footwear on an online auction website.

FIGS. 3-8 illustrate an example system and method of anti-counterfeiting for an online auction website. The item for sale in these examples is an article of footwear. A seller may decide to sell an article of footwear in an online auction 300, as illustrated in FIG. 3. The auctioneer may require that the seller select one or more categories that correspond to the item to be sold in the online auction 302. In this example, the seller may select footwear and/or athletic apparel as the category. To create the listing for the article of footwear 304, the seller may be required to enter a title for the listing 306, a size 308, width 310, style 312, color 314, and condition of the footwear 316. Any other descriptive fields may be entered. Some of these description characteristics may be required and others may be optional. In one exemplary embodiment, the brand of the footwear 318 and the footwear's product code 320 from the brand manufacturer may also be entered by the seller during the creation of the listing.

Figure 4:
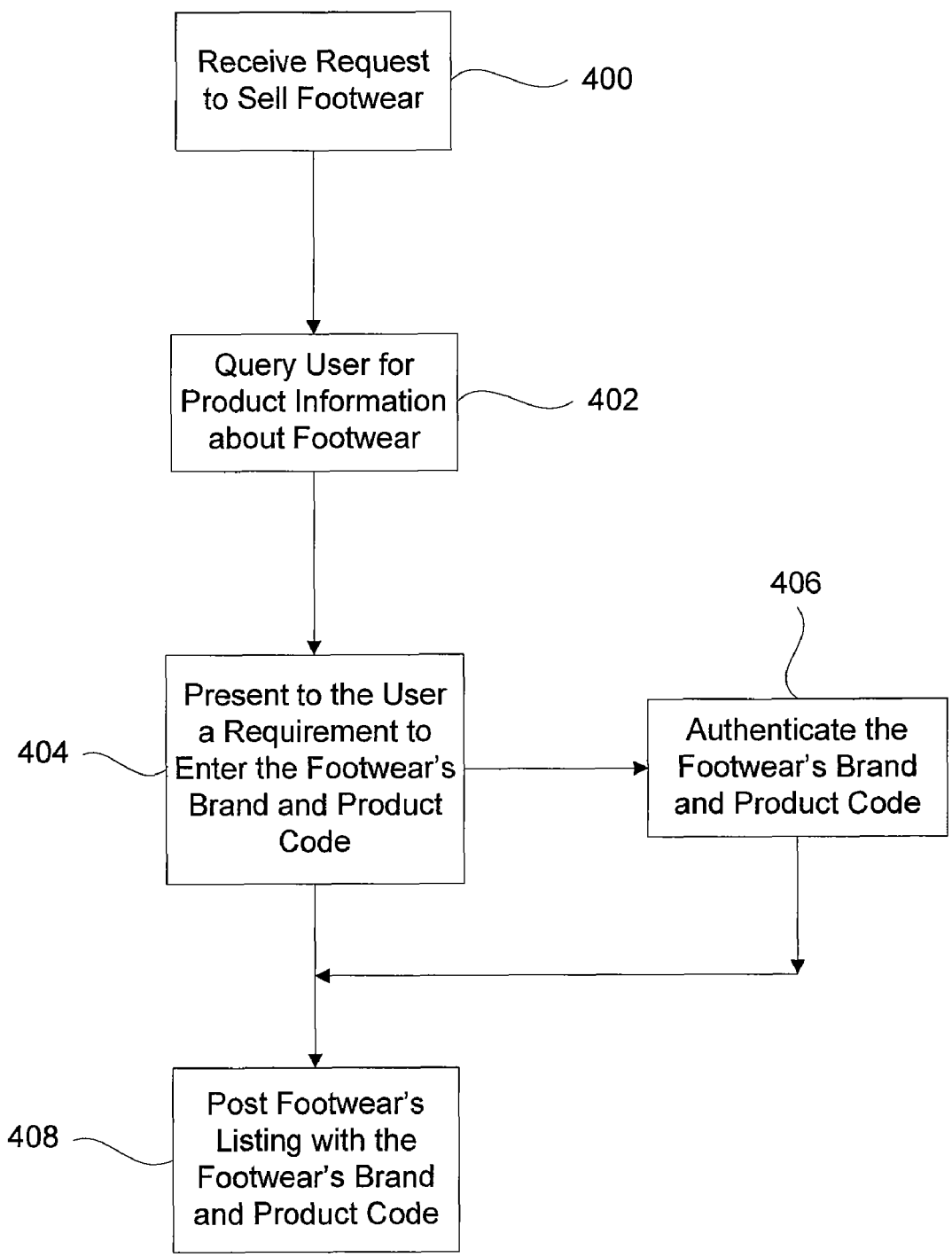
FIG. 4 is a flowchart of a process of receiving a request to sell an article of footwear on an online auction website.

As shown in FIG. 4, during this process, the auctioneer may receive a request from a seller to sell an article of footwear 400. The auctioneer may query the user for the product information described above relating to the footwear that is being sold 402. In some examples, the auctioneer may require that the seller enter the brand of the footwear and/or the footwear's product code (unique identifier) 406. The listing of the footwear may be posted with the footwear's brand and product code 408. Sometimes, the brand and product code of the footwear is automatically included in various portions of the listing, as shown in FIG. 4. For example, the brand and product code may be automatically inserted into the title and/or description of the listing. In an exemplary embodiment, if the user does not enter the brand code or the product code, the system does not allow the user to finish creating a listing for the item and therefore, the item is not posted for sale.

Figure 5:
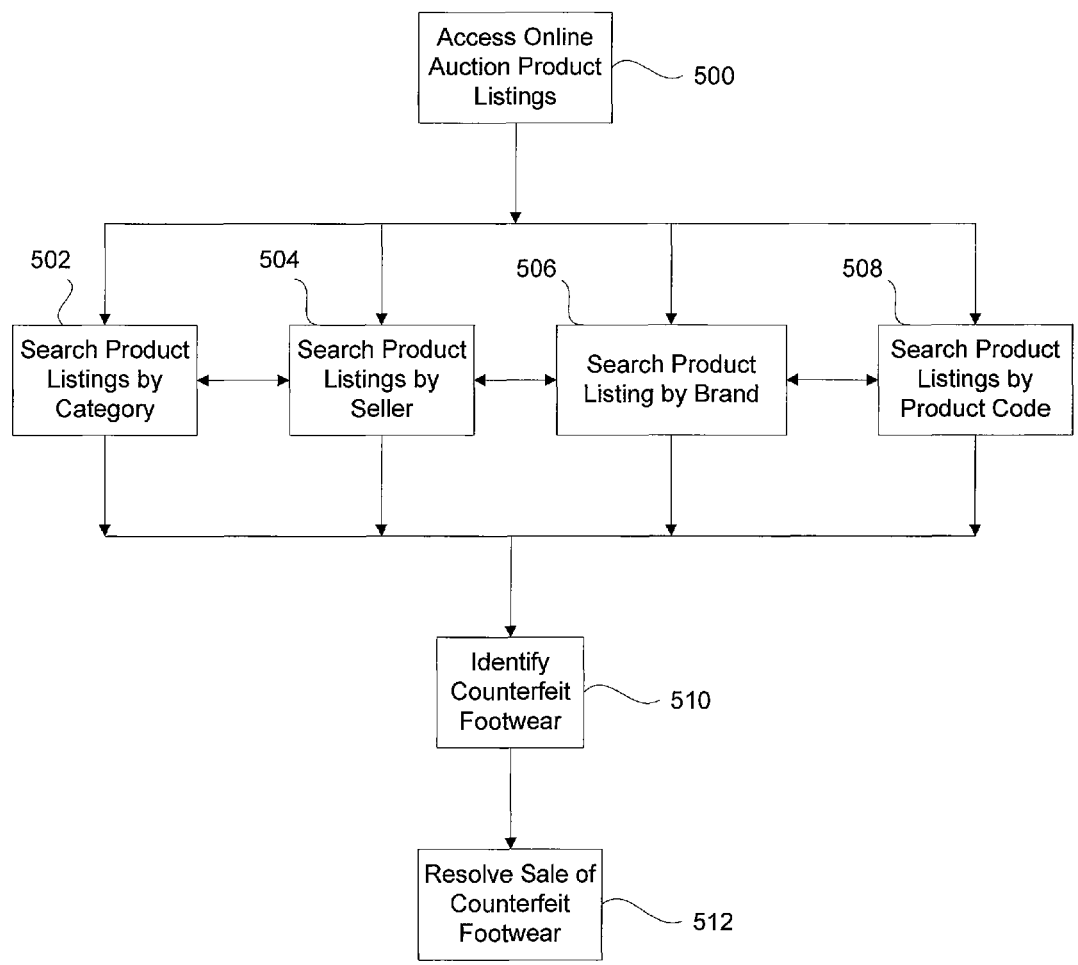
FIG. 5 is a flowchart of a process of identifying counterfeit articles of footwear for sale on an online auction website.
Figure 7:
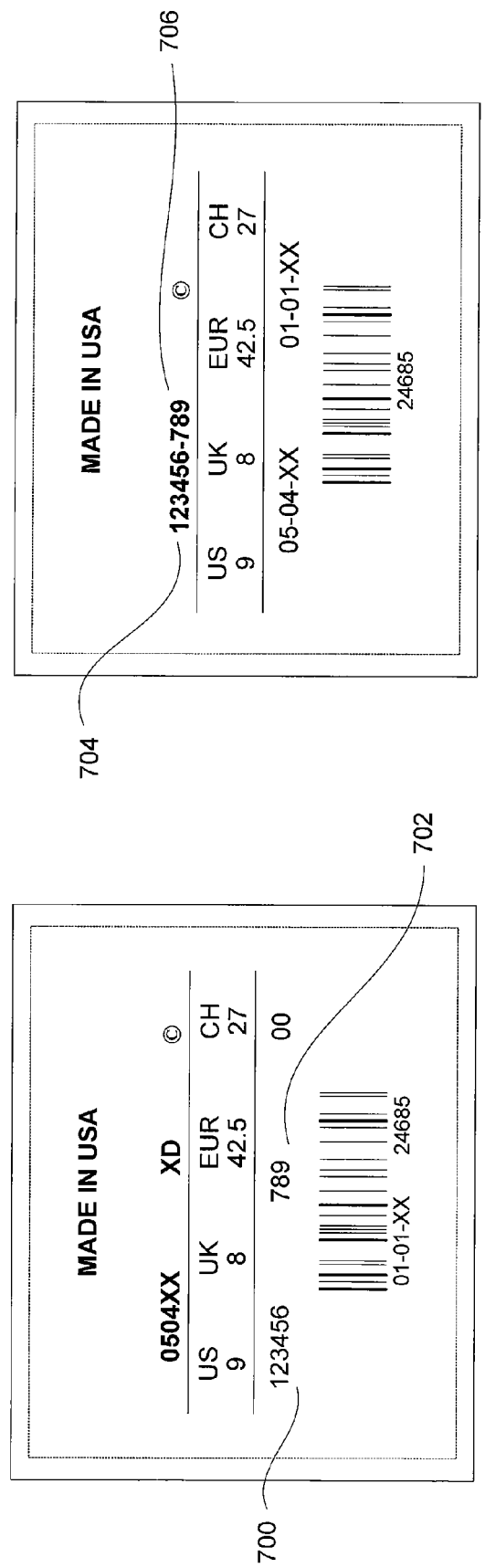
FIGS. 7A and 7B illustrate example labels for an article of footwear for assisting a seller to locate the product identification code.

The listings that include the footwear's brand and product code may be accessed by other users 500 (or a software application). The term "users," as defined herein, may include humans and/or computing devices. The term also may include software applications. Any one or more users may perform any function on or manipulate the listings, either automatically or manually. Another user may search for the footwear by various characteristics of the footwear. As illustrated in FIG. 5, a user may search the product listings by category 502 to view all of the footwear that is available for sale in the online auction. A user may also search the product listings by the seller's name to view all items that are being sold by a particular seller 504. A user may search the product listings by brand 506 to view all of the items of a particular brand that are being sold in the online auction. A user also may search the product listings by product code 508 to view all of the items for sale that have a particular product code. Any suitable search criteria may be implemented, including but not limited to color, size, style, images, shipping methods, payment methods, and the like.

Some of the listings may be required to include the article of footwear's brand and product code. An analysis of the authenticity of the footwear may be performed by performing a search for the footwear's brand and/or product code and determining whether the footwear is authentic based on the information contained in the listing. When the footwear description does not match the brand and/or the product code, the footwear may be identified as counterfeit footwear. In another example, if the product code is either invalid (does not match a list of known product codes for a manufacturer or brand) or the product code provided by the seller does not match the item being sold, then the footwear may be identified as a counterfeit item. Other data could also be used to identify a mismatch of data indicating a counterfeit item. This data could be used separately from, or in conjunction with the brand code and product code. This information is also used to help identify counterfeit footwear 510. The attempted sale or the sale of the counterfeit footwear may be resolved 512. The resolution may be in various forms, such as, but not limited to, submitting a request to the auctioneer that the listing is removed from the online auction. It is further understood that if a mismatch occurs as described above, the system may prompt the seller/user with additional information to be entered that could be used to further identify the seller or associated parties.

Various people and entities may be responsible for verifying the authenticity of the footwear or other items that a seller wishes to sell on the online auction's website. For example, the auctioneer, the manufacturer of the item, a buyer, a monitoring agency, the government, or any combination thereof may analyze a listing to verify the authenticity of the item being sold. This analysis may be performed by a human being or a computing system. The human being may perform the verification process by manually analyzing each listing or a selected group of listings. The computing system may perform the verification process by implementing software that identifies possible counterfeit items based on the contents of the listings. The human and the computing system may perform these methods either manually or automatically and the criteria may be based on any characteristics of the listing, including but not limited to the brand and the product code of the item for sale. The computing system may also automatically provide a report of the analysis that includes a listing of the auctions containing counterfeit (and/or potentially counterfeit/suspicious) items.

FIG. 6 illustrates an example screenshot of a webpage 600 in which a seller may create a listing for selling an article of footwear on an online auction website. In this example, the seller has selected the category of "Men's Shoes" 602 as the category of the item for sale. The seller may enter a title 604 for the listing and may enter the size 606, width 608, style 610, and color 612 of the article of footwear. In this example, the seller is required to enter the brand of the article of footwear 614 and the product code 616 for the article of footwear.

In FIG. 6, the seller is creating a listing for grey basketball shoes, in a size 9 medium width. The basketball shoes are manufactured by the "XYZ Corp." and have a product code of 1234567890. The XYZ Corp. may be manually entered by the user or may be selected by the user from a list of possible manufacturers. Each manufacturer may have different product codes for its goods. Therefore, the seller may be prompted to enter the product code only after the brand of the footwear or other item has been entered. In this example, the auctioneer provided the seller with the option to seek help in identifying the product code for an item. FIG. 6 illustrates an encircled question mark 618 that provides a link to an example label containing a product code for the XYZ Corp. The auctioneer may provide the seller with any form of assistance to identify or locate the product code for an item.

In some examples, the seller may choose a brand from a list of available brands, such as in the form of a drop down menu provided by the auctioneer. The list may include the most popular brands available for the category of item that is being sold. However, it is unlikely, although not impossible, to list every brand of the item being sold. For example, thousands of manufacturers may manufacture apparel and footwear, although only ten may be the leading brands that are most frequently sold on the online auction website. The drop down menu in this example may include the names of the ten leading brands and an option to select "other" as the brand. If the XYZ Corp. is selected as the manufacturer of the article of footwear, then the seller will be required to enter the product code before the listing will be posted in the auction.

Some sellers may create a listing that includes a brand described as "other" or may enter a sub-brand (i.e., a line of products manufactured by the brand) within the brands available in the drop down menu of the available brands. For example, if XYZ Corp. manufactures a line of athletic shoes called "Basketball Star," then the seller may choose to enter "other" or "Basketball Star" in the brand field rather than XYZ Corp. in an attempt to avoid the requirement to enter the product code for the article of footwear. Such a listing may then be posted for online auction without any reference to the brand or the product code associated with the footwear. When such a listing is discovered, the auctioneer may place the listing on hold until the seller enters the necessary information. If and when the seller is able to provide the necessary authenticating information, then the listing may become active again in the online auction. Authenticating information may include the proper brand name and product code, the store receipt for purchase of the footwear, an image of the label containing the product code, and/or any other authenticating information. If the seller is unable to produce the authenticating information, then the listing may be canceled or other consequences enforced.

In another example, "Basketball Star" may be identified as a line of athletic shoes sold by XYZ Corp. When the seller attempts to enter "Basketball Star" to describe the item without including the manufacturer's name, the listing may automatically require that the seller enter the product code for the shoes before permitting the listing to post on the online auction website. Manufacturers may be able to identify their most popular or most commonly purchased sub-brands of an item and provide this compilation to the online auctioneer. Anytime a seller wished to seller an item and described it with the sub-brand title, then the online auctioneer would require that the seller provide the authentic product code prior to permitting the seller to post the listing for sale on the website. Identifying all sub-brands for every manufacturer of items sold on an online auction website may impractical, although not impossible. However, the online auction website could combat this problem by requiring that a known brand is selected prior to permitting the posting of a listing that includes a sub-brand (e.g., if only a sub-brand is included in the listing, the online auctioneer will not post the listing on the auction website, but rather will require additional information from the seller prior to posting the listing). In another example, the online auctioneer may maintain a list of the most popular or most often counterfeited sub-brands. When one of those sub-brands appears in a listing without the corresponding manufacturer listed, then the online auctioneer may require additional information from the seller, such as the product code.

FIGS. 7A and 7B illustrate example labels for footwear that may appear when the seller selects the encircled question mark "help" button described in FIG. 6. Such labels may appear on all authentic footwear that is manufactured by the XYZ Corp. The labels may identify the possible locations in which the product code may be found in order to provide assistance to sellers creating listings of authentic items. For example, the product code may be in the form of a style number that corresponds to the style of the footwear and a color code that corresponding to the color of the footwear. In FIG. 7A, the example style number is a 6-digit number comprising "123456" 700 and the color code is a 3-digit number comprising "789" 702. In FIG. 7B, the example style number is also a 6-digit number comprising "123456" 704 and the color code is a 3-digit number comprising "789" 706. Additional information may be included in the help function that may assist a user in identifying the product code or any other authenticating feature or features of the item to be sold.

Figure 8:
FIG. 8 illustrates a screenshot of the listing of an article of footwear for sale on an online auction website.

FIG. 8 is a screenshot of the posted listing for the footwear that is being sold in the online auction. The title and the description of the listing include the brand, "XYZ Corp." and the product code "1234567890." In this example, the brand and the product code were automatically entered into the title and the description of the listing upon creation of the listing. The seller had no control over whether the brand and the product code were included in the posted listing in the title and description. The auctioneer required that the brand and product code were automatically included in the title and the description. The auctioneer's computing system may be programmed to require the brand and product code before the listing may be created or posted for sale.

FIG. 8 also identifies the seller of the footwear that is for sale. The listing includes a section entitled, "Meet the Seller," which identifies the seller responsible for posting the listing and the feedback that the seller has earned. A buyer may submit a review of the seller and/or may contact the seller via the identifying information provided in this section of the listing. This section of the listing also may be automatically included in the listing by the auctioneer.

In some examples, the auctioneer or any other party/entity may have access to a list of authentic product codes and may compare the product code entered by the seller with the list of the authentic product codes. If the product code is not found on the list, then the listing is not created and the seller may not proceed to post the item for sale in the online auction. An alert may be sent to the manufacturer of the counterfeit item or the information may be compiled and stored for use in the resolution process.

In other examples, the manufacturer or a representative thereof may search the online auction listings for counterfeit items. This search may be based on any identifying information, such as the images, the brand, the product code, the color, the seller's reputation, or any other identifying information. In some examples, the manufacturer may search by sub-brands or lines of product (e.g., the "Basketball Star" line of product described above). In these example systems and methods, the manufacturer may search by brand to identify potential counterfeit items for sale and by sub-brand to identify listings that do not follow the proper procedure for creating a listing (i.e., the seller failed to enter the brand and product code).

Once a listing or group of listings is found in a particular search, the manufacturer may analyze each listing to determine whether the items being sold are counterfeit items. For example, the manufacturer may first verify that the product code is authentic, e.g., that the entered code is a code actually used by the manufacturer or that the code is indeed associated with the particular kind of item being offered for sale. If the code is authentic, further analysis of the listing may be performed, such as verifying that the photographs or images of the footwear match the style number (and/or the product code) for that article of footwear. Additionally, the color code may also be matched to the seller's image or photograph of the footwear and/or the descriptive text of the color entered by the seller. Any method may be employed by the manufacturer to verify the authenticity of the footwear or other item for sale on the online auction website.

Sometimes, a seller may enter an invalid product code. In the example where the monitoring for counterfeit goods is performed by the manufacturer, the invalid product code may be documented. The manufacturer has the ability to compare entered codes with actual valid codes. The manufacturer may search for other listings that include the invalid product code and/or the seller of the counterfeit items and may quickly identify additional counterfeit items for sale. The manufacturer may also be able to identify the seller of the counterfeit goods and search by the seller's identity for additional listings that this seller is posting in the online auction that may have a risk of being counterfeit items. The manufacturer can identify such listings to the auctioneer. The auctioneer may terminate a listing if it includes counterfeit goods and may also prohibit a seller from posting listings if the seller is known to sell counterfeit goods.

Regardless of the source of the identification of the counterfeit goods, such information may be used to assist in resolving the sale or attempted sale of counterfeit goods, such as footwear. The information may be used to track a seller's history of selling counterfeit goods and identify the new invalid product codes that are being used by the sellers of counterfeit goods. The information also may be used to investigate the entity or person that is manufacturing the counterfeit goods (the source of the counterfeit goods). The information may be compiled by any entity such as the auctioneer, the manufacturer, a third party, a monitoring service, law enforcement, and the like.

In some examples, the online auctioneer would provide a list of possible brands that a seller may enter to describe the item for sale. A seller may intentionally or unknowingly select the option of "other" to describe the brand of the footwear. When such a brand is selected, the seller is not required to provide the product code in the listing and thus a listing is created for online auction that avoids the safeguard of providing the brand and the product code to verify authenticity. When these listings are identified, the auctioneer may place them "on hold." A listing that is placed on hold is not available in the online auction and users are not able to view it (the listing is no longer "posted").

For example, a manufacturer may search the listings on the online website by a sub-brand sold by the manufacturer, such as the "Basketball Star" example described above. The manufacturer may find a listing for product(s) described with the brand "Basketball Star." In this case, the listing does not include the brand and the product code. The seller that created this example listing may have inadvertently or intentionally avoided the step of entering the proper brand and product code. In this case, the manufacturer may wish to send a request to the online auctioneer to place the listing on hold until the seller enters the brand and product code. If the seller provides the online auctioneer with the brand and product code or provides other satisfactory authenticating information, then the listing will be posted. However, if the seller is unable to provide the brand and product code or satisfactory authenticating information, then the listing may be removed from the online auction website.

The above-described process of identifying counterfeit goods may be applied to the sale of any item that is offered through an online auction website. Any product identifier or authenticating data may be used to verify the authenticity or source of the item being sold.

Aspects of the invention have been described in terms of illustrative embodiments thereof. Numerous other embodiments, modifications, and variations are within the scope and spirit of the appended claims. For example, the steps illustrated in the figures may be performed in other than the recited order, and that one or more steps illustrated may be optional in accordance with aspects of the disclosure. Of course, the methods and systems of the above-referenced embodiments may also include other additional elements, steps, computer-executable instructions, or computer-readable data structures. In this regard, other embodiments are disclosed herein that can be partially or wholly implemented on a computer-readable medium, for example, by storing computer-executable instructions or modules, or by utilizing computer-readable data structures.

We claim:

1. An apparatus, comprising:
a processor; and
a memory having stored therein machine executable instructions, that when executed, cause the apparatus at least to:
process a request to create a listing for an item for sale in an online auction;
process a manufacturer and product code indicated to be associated with the item;
compare the product code to a listing of product codes associated with the manufacturer;
post the listing on an online auction website;
determine that the item is potentially counterfeit due to the product code not matching at least one product code included in the listing of product codes; and
in response to the determining, permit the listing to identify the manufacturer as a producer of the item and to remain on the online auction website even though the item is potentially counterfeit, identify a second item that is associated with a seller of the item, and track a sale or an attempted sale of the item and a sale or an attempted sale of the second item via the online auction website.

2. The apparatus recited in claim 1, wherein the memory having stored therein machine executable instructions, that when executed, cause the apparatus to
identify the second item as potentially being counterfeit.

3. The apparatus recited in claim 1, wherein the memory having stored therein machine executable instructions, that when executed, cause the apparatus to verify whether the product code matches a format for authentic product codes for the manufacturer.

4. The apparatus recited in claim 1, wherein the memory having stored therein machine executable instructions, that when executed, cause the apparatus to verify whether at least one of a color, style, year of manufacture, and material of the item corresponds to at least one of a color, style, year of manufacture, and material associated with the product code.

5. The apparatus recited in claim 4, wherein the memory having stored therein machine executable instructions, that when executed, cause the apparatus to verify whether the product code matches the item in the listing.

6. An apparatus, comprising:
a processor; and
a memory having stored therein machine executable instructions, that when executed, cause the apparatus at least to:
process a request to create a listing for an item for sale in an online auction;
query for entry of a product code corresponding to a manufacturer of the item;
post the listing to a website for the online auction;
determine that the item is potentially counterfeit due to the product code not being provided or not being authentic; and
in response to the determining, permit the listing to identify the manufacturer as a producer of the item and to remain on the online auction website, identify a second item that is associated with a seller of the item, and track a sale or an attempted sale of the item and a sale or an attempted sale of the second item via the online auction.

7. The apparatus recited in claim 6, wherein the apparatus determines that the product code is not authentic if the product code does not match a format for authentic product codes for the manufacturer.

8. The apparatus recited in claim 7, wherein the apparatus determines that the product code is not authentic by verifying that at least one of a color, style, year of manufacture, and material of the item does not correspond to at least one of a color, style, year of manufacture, and material associated with the product code.

9. The apparatus recited in claim 6, wherein the memory having stored therein machine executable instructions, that when executed, further cause the apparatus to present a query requiring inclusion of the manufacturer in the listing.

10. The apparatus recited in claim 6, wherein the memory having stored therein machine executable instructions, that when executed, further cause the apparatus to place the listing on hold until the product code for the item is provided.

11. The apparatus recited in 6, wherein the memory having stored therein machine executable instructions, that when executed, further cause the apparatus to compare the product code to authentic product codes for the manufacturer.

12. The apparatus recited in claim 11, wherein the memory having stored therein machine executable instructions, that when executed, further cause the apparatus to verify whether the product code matches the item in the listing.

13. A method comprising:
processing information about an item to list for sale in an online auction, the information including at least one of a manufacturer of the item and a sub-brand of the item;
processing, by a computer, a product code for the item corresponding to at least one of a manufacturer of the item and a sub-brand of the item;
posting the listing on an online auction website;
determining that the product code is not an authentic product code for at least one of the manufacturer and the sub-brand, or that the product code is authentic but does not match the item being offered for sale; and
in response to the determining, identifying the item as potentially being counterfeit, permitting the listing to identify the manufacturer as a producer of the item and to remain on the online auction website, identifying a second item that is associated with a seller of the item, and tracking a sale or an attempted sale of the item and a sale or an attempted sale of the second item via the online auction website.

14. The method recited in claim 13, wherein the sub-brand is manufactured by the manufacturer.

15. The method recited in claim 13, wherein the determining further comprises comparing the product code to known authentic product codes for the manufacturer of the item and the sub-brand.

16. The method recited in claim 13, wherein the determining further comprises identifying at least one characteristic of products sold by the manufacturer and comparing the at least one characteristic with the item.

17. A computer readable medium storing executable instructions, that when executed, cause an apparatus at least to:
process a request to create a listing for an item for sale in an online auction;
process a manufacturer and a product code indicated to be associated with the item;
compare the product code to product codes associated with the manufacturer;
post the listing on a website for the online auction;
determine that the item is potentially counterfeit due to the product code not matching at least one product code of the product codes associated with the manufacturer; and
in response to the determining, identify the item as potentially being counterfeit, permit the listing to identify the manufacturer as a producer of the item and to remain on the online auction website, identify a second item that is associated with a seller of the item, and track a sale or an attempted sale of the item and a sale or an attempted sale of the second item via the online auction.

18. The computer readable medium recited in claim 17, wherein the instructions, when executed, cause the apparatus to determine that the product code is not authentic if the product code does not match a format for authentic product codes for the manufacturer.

19. The computer readable medium recited in claim 17, wherein the instructions, when executed, cause the apparatus to determine that the product code is not authentic by verifying that at least one of a color, style, year of manufacture, and material of the item does not correspond to at least one of a color, style, year of manufacture, and material associated with the product code.

20. The computer readable medium recited in claim 17, wherein the executable instructions, when executed, further cause the apparatus to present a query requiring inclusion of the manufacturer in the listing.

21. The computer readable medium recited in claim 17, wherein the executable instructions, when executed, further cause the apparatus to place the listing on hold until the product code for the item is provided.

* * * * *